A. O., A. R. & C. W. NORDQUIST.
AUTOMOBILE FRONT AXLE WITH DRIVE.
APPLICATION FILED JUNE 2, 1909.
966,586.
Patented Aug. 9, 1910.
2 SHEETS—SHEET 1.
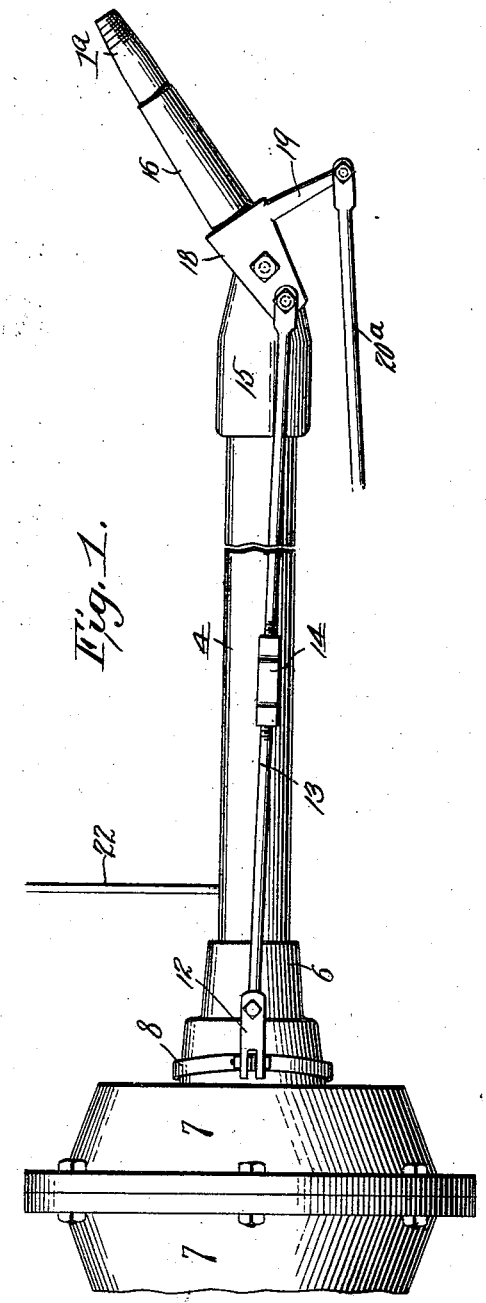
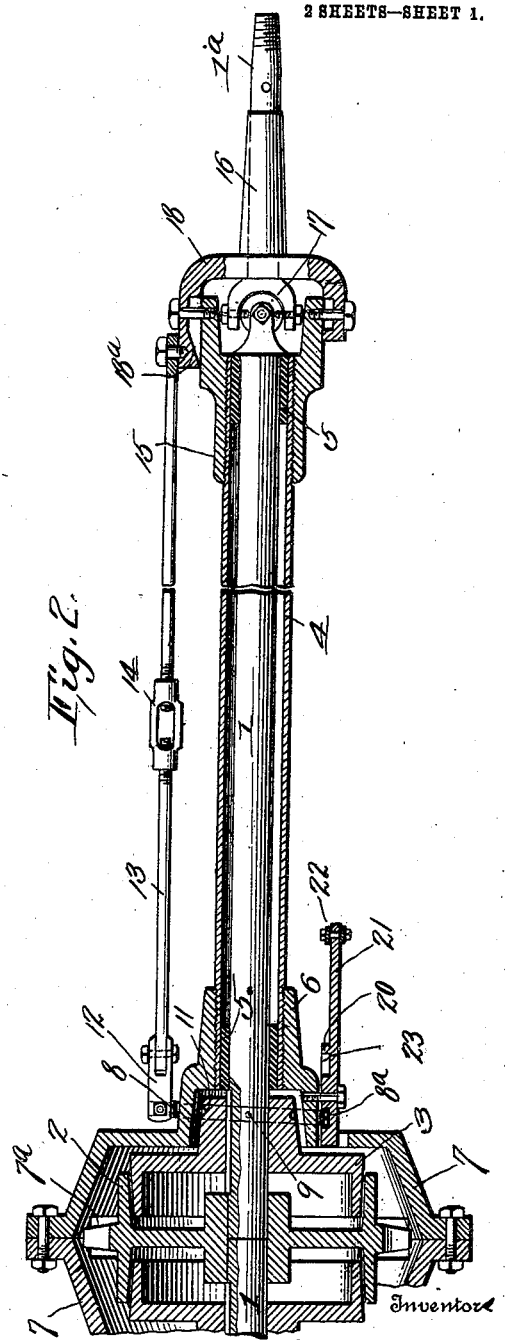
A. O. Nordquist,
A. R. Nordquist, and
C. W. Nordquist.

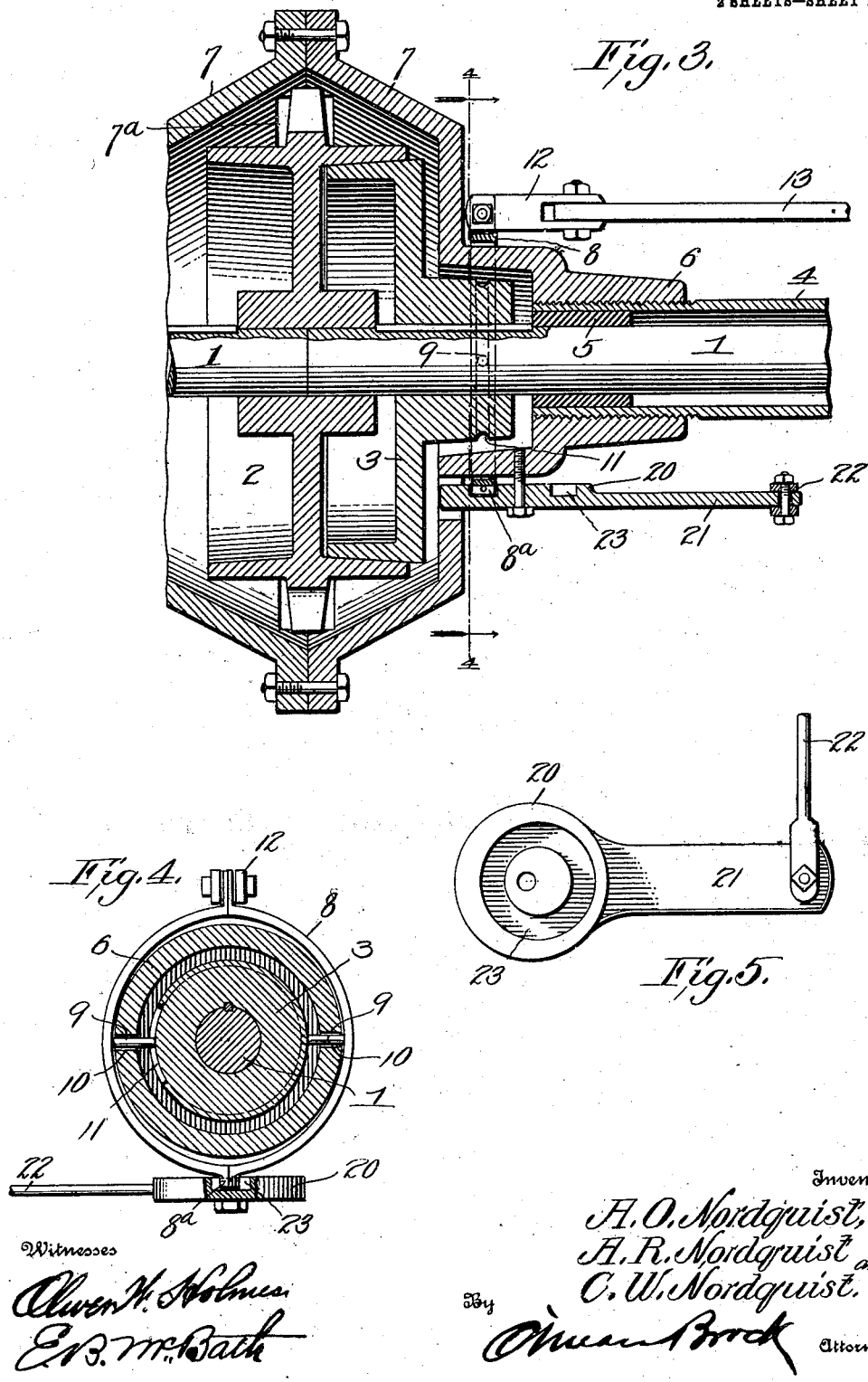

UNITED STATES PATENT OFFICE.

ANDREW O. NORDQUIST, AXEL R. NORDQUIST, AND CARL W. NORDQUIST, OF MINNEAPOLIS, MINNESOTA.

AUTOMOBILE FRONT AXLE WITH DRIVE.

966,586.  Specification of Letters Patent.  Patented Aug. 9, 1910.

Application filed June 2, 1909. Serial No. 499,656.

*To all whom it may concern:*

Be it known that we, ANDREW O. NORDQUIST, AXEL R. NORDQUIST, and CARL W. NORDQUIST, citizens of the United States, residing at Minneapolis, in the county of Hennepin and State of Minnesota, have invented a new and useful Improvement in Automobile Front Axles with Drives, of which the following is a specification.

This invention relates to a front axle drive, a steering knuckle, means connecting the steering knuckle and a clutch for driving the front axle for the purpose of automatically disengaging the clutch from a driven sprocket wheel in turning corners or upon curves, together with manually operated means for holding the clutch in engagement with the sprocket wheel when it is desired to round a curve and at the same time drive the front axle.

It will be obvious that it is usually desirable to disengage the driven axle from the driving mechanism especially when making a sharp turn but at the same time it is occasionally necessary, as when making a turn upon an up-grade, to retain the connection between the axle and the engine, and our invention especially relates to means by which the automatic action of the knuckle in making a turn is counteracted at the will of the operator.

The invention consists in the novel features of construction, combination and arrangement of parts, all of which will be hereinafter fully described and pointed out in the claims.

In the accompanying drawings: Figure 1 is a plan view of the invention. Fig. 2 is a longitudinal section. Fig. 3 is an enlarged detail sectional view showing the mechanism for connecting the front axle with the driven sprocket, together with means for holding said clutch in engagement with the sprocket irrespective of the position assumed by the steering knuckle. Fig. 4 is a section taken on the line 4—4 of Fig. 3. Fig. 5 is a plan view of a cam intended to counteract the turning of the steering knuckle by shifting the fulcrum upon which the clutch collar works.

It will be understood that these drawings illustrate only one-half of a front axle and that the parts shown in these drawings, with the exception of the sprocket wheel, are duplicated upon the other half of the axle, and it will also be understood that a sprocket chain is employed, the chain being omitted from the drawings.

In these drawings 1 represents a rotatable front axle of a motor vehicle provided at its ends with wheel spindles $1^a$, only one of which appears in the drawings. Mounted centrally and loosely upon this axle is a sprocket wheel 2 flanged upon each side for engagement with a clutch 3 slidably keyed to the axle 1, said clutches being arranged upon opposite sides of the sprocket wheel and being independent of each other. In the drawings only the right hand clutch is shown as the left hand clutch would be an exact duplicate of that upon the right hand side.

Considering therefore only the right hand half of the axle, it will be noted that it is inclosed by a sleeve 4, brass journals 5 for the axle to turn in being placed in opposite ends of the sleeve. Adjacent the sprocket wheel a hub 6 is threaded upon the sleeve 4 and carries one-half of a shield or casing 7, which casing incloses the clutch mechanism and the sprocket wheel, being provided with suitable openings $7^a$ through which a sprocket chain may run. A split collar 8 is provided with inwardly extending oppositely arranged pins 9 which pass through suitable openings 10 formed in the hub 6 and these pins engage an annular groove 11 formed in the slidable clutch 3. A connecting block 12 is oppositely bifurcated at its ends and in the bifurcation of one end are pivoted up-turned end portions of the split collar 8, and in the horizontal bifurcation at the opposite end of the block 12 is pivoted the inner end of a connecting rod 13, the length of said rod being adjustable by means of a turn buckle 14, the rod being formed in two sections, and the outer end of the rod is pivotally connected to a steering knuckle which will be more fully described hereafter. The outer end of the axle 1 is reduced and a sleeve 15, which is threaded upon the sleeve 4, projects beyond the end of the axle to partially inclose a ball and socket connection between the axle 1 and the spindle $1^a$. Loosely mounted upon this spindle is a sleeve 16 which carries a steering knuckle 18 pivotally mounted to swing upon the projecting portion of the sleeve 15. These parts are loosely connected in order to permit necessary play upon the part of the spindle 1ª. The upper portion of the knuckle 18 has an inward extension 18ª to which the connecting rod 13 is pivoted.

It will now be obvious that when the spindle 1ª and the knuckle 18 are thrown at an angle to the axle 1, as shown in Fig. 1, the rod 13 will be moved longitudinally outwardly, thus drawing the upper portion of the collar 8 in the same direction, and as this collar rocks upon its lower portion the clutch 3 will be drawn along the axle 1 by means of the pins 9 so as to disengage the clutch from the flange of the sprocket wheel. This disengagement will normally take place upon making a turn and in order to prevent it when it is desired to hold the clutch continuously in engagement with the sprocket wheel, we provide a movable fulcrum for the lower portion of the collar 8. This consists of a cam disk 20 pivoted to turn in a horizontal plane upon the lower side of the hub 6, said cam disk being turned by means of an arm 21 and an operating rod 22, the rod being connected by any desired means to either a hand or foot lever, the latter not being shown as its form and location is not material to this invention. The cam disk 20 is provided with a cam groove 23 in which the lower end of the collar 8 rests, the collar having at this point a suitable pin or projection 8ª which rests in the cam groove, said groove being wide enough to permit the swinging of said collar. It will now be obvious that if upon the turning of the knuckle on outward movement of the upper portion of the collar, the cam 20 is rotated so that the cam groove will shift the lower end of the collar inwardly a sufficient distance to counteract the outward movement, the relative position of the collar will be unchanged with respect to the clutch, so that the latter will remain in engagement with the sprocket wheel and the front axle will continue to be driven irrespective of the position occupied by the steering knuckle. The steering knuckle is provided with the usual steering arm 19 and steering rod 20ª.

What we claim is:

1. The combination with an axle and a sprocket wheel loosely mounted thereon, of a clutch slidably mounted on the axle, a steering knuckle, a shifting collar for said clutch, means connecting the collar and the knuckle, and means for shifting the support of the collar, as and for the purpose set forth.

2. The combination with an axle having a sprocket wheel loosely mounted thereon, and a slidable clutch for engaging said sprocket, of a clutch operating collar, a steering knuckle, and a rod connecting the collar and the knuckle and shifting the collar into a position to disengage the clutch when the knuckle swings at an angle to the axle.

3. The combination with an axle having a sprocket wheel loosely mounted thereon and a slidable clutch for engaging said sprocket, of a clutch operating collar, a steering knuckle, a rod connecting the collar and the knuckle and shifting the collar into a position to disengage the clutch when the knuckle swings at an angle to the axle, and means operatively connected with the collar and operated independent of the knuckle for counteracting the pull of the knuckle upon the collar.

4. The combination with an axle, of a sprocket wheel loosely mounted thereon, a clutch slidable upon the axle, a collar having inwardly extending pins engaging said clutch, the collar being supported at its lower end, a knuckle pivotally mounted adjacent the outer end of the axle, an extension formed upon the upper portion of the knuckle, and a shifting rod pivotally connected to said extension and to the upper portion of the collar.

5. In a device of the kind described comprising an axle, a steering knuckle, a sprocket wheel loosely mounted on the axle, a clutch slidable on the axle, a collar for adjusting said clutch, a rod connecting the upper portion of the collar with the upper portion of the steering knuckle, and drawing said collar outwardly when thrown at an angle to the axle, a cam having a cam groove receiving the lower end of said collar, and means for rotating said cam for the purpose of shifting the position of the lower end of the collar relative to the clutch, as and for the purpose set forth.

6. The combination with an axle, a sprocket wheel loose thereon, a clutch slidable thereon, a collar for moving said clutch into and out of engagement with the sprocket wheel, a cam having a cam groove formed in it, said cam being rotatably mounted below the clutch and the groove forming the fulcrum point upon which the collar swings, a steering knuckle, a rod pivoted to the knuckle and to the side of the collar opposite the cam, and means independent of the steering knuckle for giving said cam a partial rotation thereby shifting the lower end of the collar in a direction opposite the pull exerted upon it when the steering knuckle is thrown at an angle to the axle.

ANDREW O. NORDQUIST.
AXEL R. NORDQUIST.
CARL W. NORDQUIST.

Witnesses:
PETER LARSON,
DAVID A. CLARK.